UNITED STATES PATENT OFFICE.

ALBRECHT SCHMIDT, OF HÖCHST-ON-THE-MAIN, GERMANY, ASSIGNOR TO FARBWERKE, VORM. MEISTER, LUCIUS & BRÜNING, OF HÖCHST-ON-THE-MAIN, GERMANY, A CORPORATION OF GERMANY.

BORDEAUX-RED SULFUR DYE AND PROCESS OF MAKING SAME.

No. 829,740. Specification of Letters Patent. Patented Aug. 28, 1906.

Application filed February 15, 1906. Serial No. 301,166.

*To all whom it may concern:*

Be it known that I, ALBRECHT SCHMIDT, Ph. D., a citizen of the German Empire, residing at Höchst-on-the-Main, Germany, have invented certain new and useful Improvements in Pure Bordeaux-Red Sulfurized Dyestuffs and Processes of Making Same, of which the following is a specification.

In United States Patent No. 701,435 have been described brown-violet, blue-violet, and reddish-violet sulfurized dyestuffs, the oxyazins of the type

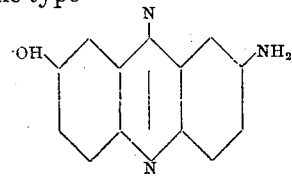

yielding violet-brownish dyestuffs of a shade similar to that of Immedial bordeaux—that is, muddy reddish violet brown—the safranoles or safraninones blue-violet to reddish-violet dyestuffs somewhat of the shade of thiogene-violet V—that is, a decided violet. The dyestuffs obtained from safranoles are not fast to acid and soda, and therefore of no value. Sulfurized dyestuffs from bodies of the type

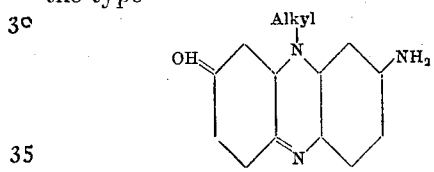

from safraninones of the fatty series are not described in United States Patent No. 701,435. I have found independently of said patent that bodies of the last-named type when heated with alkali polysulfid yield sulfurized dyestuffs dyeing a decided bordeaux red of hitherto unknown purity and redness. This could not be foreseen, for a muddy reddish violet brown and not a pure bordeaux red was to be expected. Pure bordeaux-red sulfurized dyestuffs are obtained from safraninones of the fatty series insoluble in alkali in contrast to the not alkylated oxazins, which are derived from meta-toluylenediamins alkylated in para position to the methyl group. To obtain very pure products with as little blue tint as possible, it is best not to raise the temperature too much, though even at a higher temperature and if further sulfurized products are obtained which are only slightly less pure. By starting from such safraninones of the fatty series as are obtained from chlorinated para-aminophenols sulfurized dyestuffs free from chlorin may also be obtained by first substituting the chlorin atoms for the SH groups by heating with alkali sulfids and by then sulfurizing the merkaptans thus obtained and transforming them into real sulfurized dyestuffs.

The sulfurized dyestuffs may be obtained from etho-safraninone which is best prepared from para-nitrosophenol and mono-ethyl-meta-toluylenediamin ($CH_3NH_2NHO_2H_5$) by first combining these two into indophenol and then transforming the product by boiling into ethosafraninone

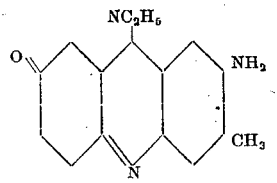

Example I: Seventy-two parts of nitrosophenol sodium containing about thirty-one parts of nitrosophenol of one-hundred-per-cent. strength are dissolved in about one thousand parts of water and just made acid to congo with hydrochloric or sulfuric acid. This solution is added with stirring for about an hour to about fifteen hundred parts of a solution partly neutralized with about one hundred and forty-five parts of sodium carbonate, of 37.5 parts of mono-ethyl-meta-toluylenediamin base and of about one hundred and ten parts of HCl, (reducing liquid, for instance, after the electrolytical elimination of tin,) whereupon the indophenol partly separates. To this is added, isolating the indophenol not requisite, about one hundred parts of sodium carbonate and then heated, whereupon about two hundred parts of manganese paste (forty per cent. of $MnO_2$) are added and the whole heated until the blue tint on blotting-paper gives way to a red shade. The filtered residue is boiled with a solution of sodium carbonate and then with dilute hydrochloric acid. From this solution the hydrochlorid of etho-safraninone crystallizes when cold. By starting from para-amidophenol the indophenol is produced in the usual manner by oxidation. Ten parts of this ethosafraninone are heated with fifty-five parts of crystallized sodium sulfid, twenty-five parts of sulfur, or, for instance, eighty parts of sodium sulfid and forty parts of sulfur to about 110° to 135° centigrade in a reflux apparatus after evaporating part of the water until no further increase of dyestuff occurs. The safraninone insoluble in alkali hydrate and alkali sulfids becomes gradually dissolved. The dyestuff thus obtained may be precipitated from the solution of the mass by acids or air. It is readily soluble in alkali sulfids and dyes cotton a beautiful pure bordeaux. When treated with copper salts on the fiber, it has the valuable property of becoming a pure violet of great fastness.

Example II: If for the etho base mentioned in Example I be substituted the corresponding metho base from mono-methyl-meta-toluylenediamin, a dyestuff having the same properties is obtained. The reaction is similar, for instance, with the benzylo base (from benzyl-meta-toluylenediamin) and with the derivatives by substitution of para-aminophenol, like, for instance, the color bases obtained from ortho-chloro-para-aminophenol, para-amino-ortho-cresol, para-aminosalicylic acid, para-aminophenol-ortho sulfonic acid, on the one hand, and from monoalkylated meta-toluylenediamins, on the other hand. The shades of the dyestuffs thus obtained hardly differ from each other. If the temperature is raised, for instance, to 140° to 160° centigrade, somewhat bluer products are obtained. The formation of the dyestuff may also occur by using other dissolvents—for instance, a solution of glycerin—or also by using pressure. The proportions of sodium sulfid and sulfur may likewise be varied.

Having now described my invention, what I claim is—

1. The process herein described for the manufacture of pure bordeaux-red sulfurized dyestuffs by heating the safraninones of the fatty series with sulfur and alkali sulfids.

2. As products, the bordeaux-red sulfurized dyestuffs obtained by heating the safraninones of the fatty series with sulfur and alkali sulfids, being soluble when heated with alkali sulfids, dyeing from this solution on unmordanted cotton bordeaux-red shades which become violet when treated with copper salts.

In testimony that I claim the foregoing as my invention I have signed my name in presence of two subscribing witnesses.

ALBRECHT SCHMIDT.

Witnesses:
JEAN GRUND,
CARL GRUND.